Patented Dec. 6, 1932

1,890,019

UNITED STATES PATENT OFFICE

WALTER M. RITCHIE, OF RAHWAY, NEW JERSEY

METHOD OF TREATING AND FILLING CAVITIES IN TREES

No Drawing.   Application filed February 20, 1931.   Serial No. 517,375.

The invention relates to a method of treating and filling cavities in trees.

The object of the present invention is to improve the treatment and filling of cavities of trees and to provide a method of treatment including a chemical enclosed within the cavity of a tree and adapted to remain effective for years and to act over a long period of time and by its own action or properties or by a combination, chemical, physical or biological, produced by it, either solid, liquid or gas, to materially retard fungoid growths and bacterial infestations in a treated cavity.

It has long been the practice of tree surgery in cavity work to remove all the decayed wood and some of the hard wood in an effort to remove every piece of mycelium of the fungus causing the rot. The cavity is then washed with bichloride of mercury, copper sulphate or similar disinfecting substance. The tree is then mechanically braced. The surfaces of the cavity are then painted with a waterproof paint and the cavity is left open or filled with cement or other composition filler.

The method of the present invention differs from the foregoing in that it does not depend entirely upon the mechanical removal of mycelium or the said disinfecting wash to eradicate the fungoid or bacterial growths present or introduced.

Fungi differ as to the degree or extent of penetration of the mycelium into the hard wood of the tree. Therefore, there is always the possibility of sufficient mycelium being left in a tree, beyond mechanical removal or the penetration of the disinfecting wash, for continued infestation or re-infestation of the rot producing fungus. At this stage of the treatment of a cavity by the present invention, bichloride of mercury, copper sulphate, or other similar disinfectants are used for the following reasons: they are inexpensive; they act quickly; they are easy to apply; and their active qualities have to all appearances disappeared by the time the fungicide and germicide material of the present invention starts its toxic reaction. However, the said disinfectants should be considered mainly as surface washes, as there have been evidences of the fact that they will greatly damage the tree when strong enough to penetrate the hard wood of the tree to any great extent.

After the cavity of the tree has been properly dug out and shaped, any mechanical bracing which may be necessary is made. The cavity is then washed with a solution of bichloride of mercury or similar fungicide or germicide that acts immediately. While the surface of the cavity is still wet, it is dusted with as much finely divided sulphur as it will hold. Flowers of sulphur and powdered sulphur have been used as a fungicide and germicide. Sulphur pastes, such as colloidal sulphur, have also been employed in the present invention and have been applied to cavities of trees. After the sulphur has been applied the sap wood edges of the cavity are painted with a tree paint or similar impervious material, for a distance of two to six inches, varying with the size of the cavity, thickness of the tree and the depth of the living tissue. This is done to prevent desiccation. The back and remainder of the sides of the cavity are left with their covering of sulphur.

The cavity is then immediately filled with cement or some other filler. Should the cavity be left for some time or the filling require a long time, and the sulphur falls off portions of the surface of the walls of the cavity, it is re-applied as necessary. When the filling of the cavity has been completed, the exterior is painted with a less pervious material than the filler material, such as a waterproof paint or a grout wash. It has also been found practical to carry out the invention by mixing with material such as cement or ground cork to be used as a cavity filler, sulphur or other substances that are in themselves toxic or produce by combination with other substances present fungicides or germicides. This filler having a fungicide or germicide incorporated in it with a waterproof coating on its exterior, will build up a concentration of the toxic materials on the interior. It is preferable to use a filler that is a good conductor of heat and which is of a pervious nature. Cement seems to answer these qualifications best at present, as it is of a pervious nature, and it is also comparatively a fair conductor of heat. This method of mixing the fungicide and germicide with the cavity filler material has given similar results to the first method of applying the fungicide or germicide, but to a lesser degree and to all appearances of a slower nature.

It has been demonstrated that, regardless of the form of sulphur employed as a fungicide or germicide, whether as a compound or uncombined sulphur, the lasting toxicity is due to an oxidation product of the sulphur itself. Liberation of the toxic substance is directly proportional to the fineness of division of the sulphur particles. The said oxides or products of oxidation will, when present or generated in sufficient concentration over a period of time and in the case of the present invention behind the cavity filling, eradicate or kill a fungoid or bacterial growth or infestation. It has been found that finely divided sulphur if enclosed with a limited quantity of air will build up a concentration of sulphur dioxide, pentathionic acid, or other toxic materials. Upon these phenomena the present method is based. The production of oxides of sulphur, hydrogen sulphide, carbon dioxide and other fungicidal and germicidal compounds through other slow chemical reactions or biological processes has been tried and is being tried. However, I have described the best methods known to me at the present time for carrying out the present invention. It will be understood that the term "normally inert" applied to sulphur refers to its germicidal and fungicidal action. Rot producing fungi require oxygen to live and in the absence of fungous growth the sulphur will remain normally inert or inactive as a germicidal or fungicidal medium, but upon activity or entrance of fungoid, bacteria or other tree destroying growth the sulphur will become effective as a fungicidal and germicidal medium because of the presence of oxygen which is necessary to support such fungoid, bacteria or other tree destroying growth.

I am aware that flowers of sulphur have been used as a dusting powder for plant mites and also have been used in emulsions and mixtures to be applied to plants either as a spray or a wash; and that it has also been proposed to plug sulphur and other material in holes bored in trees to be carried by the movement of the sap; and that it is not new to provide a composition containing furfural and other material and having the consistency of a varnish to enable it to be applied with a paint brush to plant wounds for the purpose of healing the same and such methods of applying sulphur, furfural and other substances to plants are disclaimed.

What I claim is:

1. A method of treating and filling tree cavities including the step of introducing into a cavity separately and independently of the cavity filler a normally inert fungicide and germicide medium which becomes effective upon activity or entrance of fungoid, bacterial or other tree destroying growth and substantially excluding air from the tree cavity.

2. A method of treating and filling tree cavities including the step of applying to the surfaces of the cavity a normally inert fungicide and germicide medium which becomes effective upon activity or entrance of fungoid, bacterial or other tree destroying growth and substantially excluding air from the tree cavity.

3. A method of treating and filling tree cavities including the step of incorporating in the cavity filler a normally inert fungicide and germicide medium which becomes effective upon activity or entrance of fungoid, bacterial or other tree destroying growth, and substantially excluding air from the tree cavity.

4. A method of treating and filling tree cavities including the steps of coating the surface of the cavity with a normally inert fungicide and germicide comminuted material, and incorporating in the cavity filler a normally inert fungicide and germicide which comminuted material becomes effective upon activity or entrance of fungoid, bacterial or other tree destroying growth, and substantially excluding air from the tree cavity.

5. A method of treating and filling tree cavities including the steps of introducing into a cavity sulphur which is normally inert and which becomes effective upon activity or entrance of fungoid, bacterial or other tree destroying growth, and substantially excluding air from the tree cavity.

6. A method of treating and filling tree cavities including the step of introducing into a cavity separately and independently of the cavity filler sulphur adapted to remain effective for a long period of time to prevent, retard, kill or eradicate fungoid or bacterial growth.

7. A method of treating and filling tree cavities including the step of applying to surfaces of the cavity sulphur which is normally inert and which becomes effective upon activity or entrance of fungoid, bacterial or other tree destroying growth, and substantially sealing the sulphur back of the filler to exclude exterior air from the sulphur.

8. A method of treating and filling tree cavities including the step of incorporating in the cavity filler sulphur which is normally inert and which becomes effective upon activity or entrance of fungoid, bacterial or other tree destroying growth, and substantially excluding air from the tree cavity.

9. A method of treating and filling tree cavities including the steps of coating the surface of the cavity with sulphur, and incorporating in the cavity filler sulphur adapted to remain effective for a long period of time to prevent, retard, kill or eradicate fungoid or bacterial growth.

10. A method of treating and filling tree cavities including the step of introducing into a cavity a normally inert fungicide and germicide medium which becomes effective upon activity or entrance of fungoid, bacterial or other tree destroying growth, and substantially excluding air from the tree cavity.

11. A method of treating and filling tree cavities including the step of substantially sealing back of the filler an inert fungicide and germicide medium to exclude exterior air, which inert medium becomes effective upon activity or entrance of fungoid, bacterial or other tree destroying growth.

In testimony whereof I affix my signature.

WALTER M. RITCHIE.